United States Patent [19]

Rush

[11] Patent Number: 5,030,948

[45] Date of Patent: Jul. 9, 1991

[54] MULTIPLE CHARACTERISTIC SENSITIVE ADDRESSING SCHEMA FOR A MULTIPLE RECEIVER DATA PROCESSING NETWORK

[76] Inventor: Charles T. Rush, 516 Meadow Rd., Omaha, Nebr. 68154

[21] Appl. No.: 470,320

[22] Filed: Jan. 25, 1990

Related U.S. Application Data

[63] Continuation-in-part of Ser. No. 245,813, Sep. 19, 1988, abandoned.

[51] Int. Cl.⁵ ............................................. H04Q 7/00
[52] U.S. Cl. ........................... 340/825.44; 340/825.47; 340/825.53; 455/54; 455/58
[58] Field of Search ........... 340/825.44, 311.1, 825.47, 340/825.48, 825.52, 825.53, 825.07, 825.08; 455/31, 34, 35, 38, 54, 53, 58; 370/94

[56] References Cited

U.S. PATENT DOCUMENTS

| | | | |
|---|---|---|---|
| 4,110,743 | 8/1978 | Zahnd | 340/311.1 |
| 4,330,780 | 5/1983 | Masaki | 340/825.44 |
| 4,383,257 | 5/1983 | Giallanza et al. | 340/825.47 |
| 4,517,561 | 5/1985 | Burke et al. | 455/35 |
| 4,636,791 | 1/1987 | Burke et al. | 340/825.52 |
| 4,706,272 | 11/1987 | Nishimura et al. | 340/825.52 |
| 4,742,516 | 5/1988 | Yamaguchi | 370/94 |
| 4,783,654 | 11/1988 | Ichikawa | 455/38 |
| 4,851,830 | 7/1989 | Andros et al. | 340/825.44 |

FOREIGN PATENT DOCUMENTS 0136677  4/1985  European Pat. Off.  ........ 340/825.44

OTHER PUBLICATIONS

Morriën et al., "Digital paging encoders/decoders," 4/78, Philips Telecommunication Review, vol. 36, No. 1, pp. 41-52.

Primary Examiner—Donald J. Yusko
Assistant Examiner—Edwin C. Holloway, III
Attorney, Agent, or Firm—John A. Beehner

[57] ABSTRACT

A data transmission network enables address encoded messages to be transmitted via a radio wave type communications medium to multiple receivers, each of which is assigned a multiple byte address indicative of various characteristics of the owner of the receiver. The message addresses may include wild card characters to designate applicability to all receivers. If the message address matches the receiver address, the message is stored in a review. The stored messages may be output by alternative apparatus including a circuit capable of generating audio from digital data, a computer or terminal for storage and reuse of the message, and a printer.

14 Claims, 3 Drawing Sheets

MULTIPLE CHARACTERISTIC SENSITIVE ADDRESSING SCHEMA FOR A MULTIPLE RECEIVER DATA PROCESSING NETWORK

CROSS-REFERENCE TO RELATED APPLICATION

This is a continuation-in-part of application Ser. No. 7/245,813, filed Sept. 19, 1988.

BACKGROUND OF THE INVENTION

The present invention is directed generally to a data transmission network and more particularly to such a network wherein each of the multiple receivers are assigned an address indicative of multiple characteristics of the owner of the receiver and wherein each receiver is operative to receive and store in random access memory (RAM) those messages which have an address corresponding to any one of the multiple characteristics designated by the receiver address, the receiver furthermore being operative to signal the operator when a message has been stored.

Many systems have been devised for transmitting and receiving data, however, all of these devices have certain shortcomings. Facsimile machines and computer modems can transmit and receive data over telephone lines but the required physical hardware link limits their usefulness.

Radio teletype systems have been known for many years. Data is transmitted without an address and without error-checking protocols. Accordingly, radio teletype owners are without a means of screening messages having no relevance to them.

Within the Amateur Radio Service, an operator can send a digital message throughout a region and receive an acknowledgement. However, these messages may only be sent to a single other operator or electronic bulletin board (Packet Radio is the descriptive title of the mode of communication which refers to this message passing).

Known to the art are communications systems that utilize electromagnetic radiation to send information not available to the public at large. Systems of this type include the Physician's Radio Network, and stock and commodity price data services which transmit quotations and prices with ebsidic code over sub-audible carriers in the regular FM broadcast band. The Physician's Radio Network provides physicians with a receiver that receives audio on a sub-audible carrier in the FM broadcast band. However, messages important to a given listener are only heard if the listener is present at the time of the broadcast.

Many professionals use pagers which receive audio or digital data communications meant only for their pager. This audio or digital data is received after an alert, such as a tone which causes the squelch to be broken and turn on the pager.

Burke, et al. U.S. Pat. No. 4,636,791 discloses a two-way radio system which enables remotes to be addressed in a manner to alert selected classifications of remote operators to respond to the alert code from a master station. However, the addressing capability is limited in that the address encoded alert code is not operative to convey a lengthy message. The Burke, et al. device simply alerts the remote operators to establish two-way voice communications.

Mori, et al., European Patent 0 136 677 discloses a paging receiver improvement for decreasing the number of switches necessary for processing stored messages. Mori, et al. does not teach a method of addressing a single message to a plurality of receivers ("group calling").

Both Giallanza, et al., U.S. Pat. No. 4,383,257, and Morriën, et al., PHILIPS TELECOMMUNICATION REVIEW, Vol. 36, No. 1, April 1978, describe devices with group calling capabilities. However, these devices are incapable, if not inoperative, for quickly and inexpensively sending a single message to receivers having an address indicating they are of a class interested in the content of a particular message.

Accordingly, a primary object of the invention is to provide an improved data transmission network.

Another object of the invention is to provide such a network wherein a message transmitted to multiple receivers may be encoded with an address designating one or more selected classifications of receivers so that a particular receiver will receive and store only relevant messages.

Another object is to provide such a network wherein the receivers are operative to receive and store messages even when unattended by an operator.

Another object of the invention is to provide such a network having a large capacity memory which is not constrained to receiving only messages of limited length.

Another object is to provide such a network that may be established using existing technology and economical instrumentation.

Another object of the invention is to provide such a network which is simple, economical and efficient in operation.

SUMMARY OF THE INVENTION

The data transmission network of the present invention includes a transmitter for transmitting messages via a radio wave type communications medium such as a sub-audible carrier on the FM broadcast band or unused portion of the VHF or UHF business bands. Each message includes address and text portions with the address portion operative to designate one or more selected classifications. The network further includes a plurality of distinct radio type receivers, each including digital memory, preferably random access memory (RAM). Each receiver is assigned a multiple byte address capable of designating several selected classifications applicable to the owner of that receiver. Each receiver is capable of identifying those messages from the transmitter which include an address portion designating any one of the selected classifications applicable to that receiver, which messages are then to be stored in RAM. The receiver then provides a signal that a message has been received and stored. Finally, an output means may afford an option of producing hardware-generated speech, communicating the message to a computer or printing the message.

Since this network is not based on acknowledgment, messages can be received and stored even when the receiver is not being monitored by an operator. Furthermore, the address assigned to a particular receiver is capable of designating multiple classifications applicable to the owner of that receiver such as the medical specialty of a physician, the rank of one in the armed services, job category, political party affiliation, community service club membership or whatever. The central transmitter can then disseminate information encoded with an address indicating the particular classifications of persons or specific persons who are to receive the transmission.

The individual's receiving unit would receive all messages but record only those messages with an address corresponding to the classifications assigned to that receiver. An indicator light or other signal would come on to indicate to the owner of the receiver that there is a recorded message awaiting his review. He would, therefore, be freed from continually monitoring the machine, could receive messages even when he is not attending the machine, and will be assured that all of the recorded messages are particularly directed to him so that he may not sort through mostly irrelevant information.

BRIEF DESCRIPTION OF THE DRAWINGS

FIG. 5 is a flow chart disclosing the various operations performed by the receiving unit of the invention.

DESCRIPTION OF THE PREFERRED EMBODIMENTS

Figure 1:
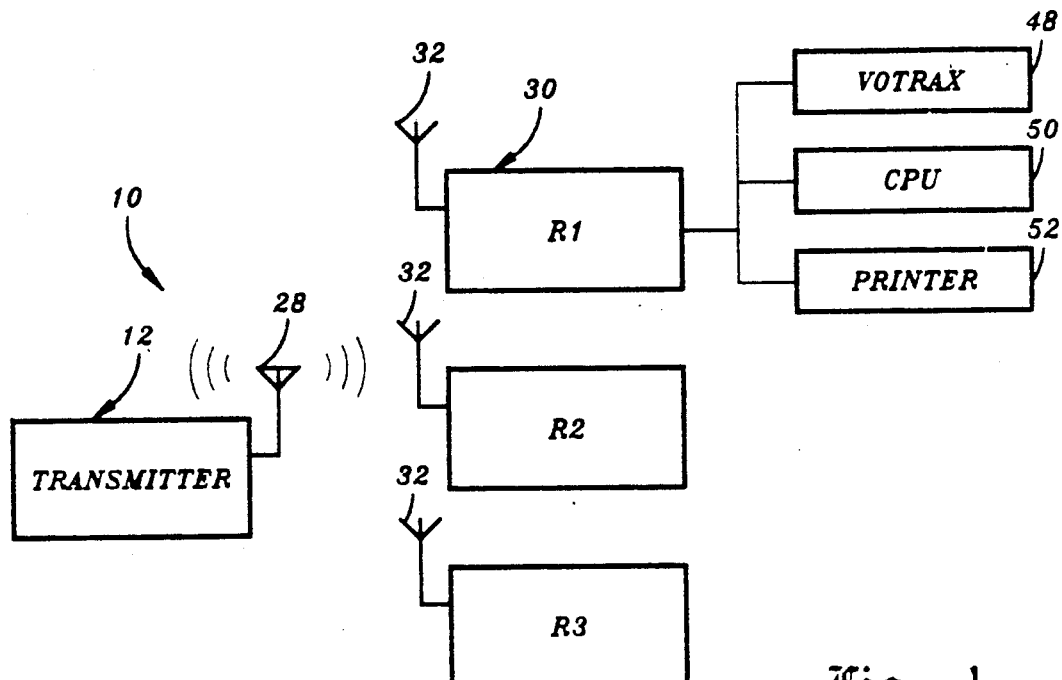
FIG. 1 is a diagrammatic illustration of the data transmission network of the invention.

The data transmission network 10 of the present invention includes a transmitting unit 12, as illustrated in FIG. 1, and multiple receiving units R1, R2, R3, etc., each equipped with an antenna 32, an alternative output apparatus including a circuit to generate audio from digital data 48 for listening to the messages through hardware generated speech, a serial output to a computer 50 for incorporating the message into memos, notes, letters and the like, and a printer 52 for preparing hard copies of the message for delivery or manual filing.

The transmitter 12 would transmit audio with high and low frequency audio tones to represent bits of information. The bits would convey information in the fashion of a radioteletype message, possibly using ASCII or ebsidic code. The messages are then transmitted via a radio wave type communications medium. That medium may be any electromagnetic radiation of a frequency common to both the transmitter and receiver, which frequency encompasses low frequency below the AM broadcast band to UHF and even to visible light.

The medium could be a sub-audible carrier on the FM broadcast band or on an unused portion of VHF or UHF business bands or even in UHF television spectrum for incorporation into existing television transmissions. (Congestion in these areas of the radio frequency spectrum has decreased due to the popularity of cellular phones).

Figure 2:
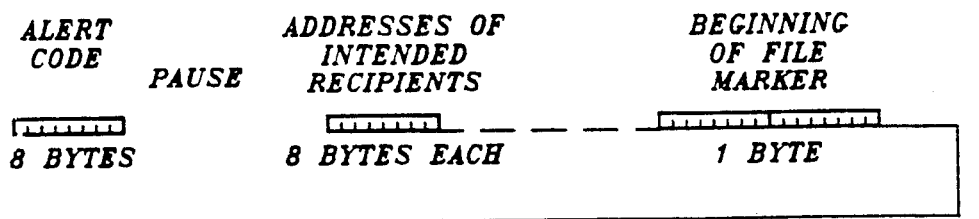
FIG. 2 is a diagrammatic illustration of the format of a message to be transmitted by the network of the invention.
Figure 2:
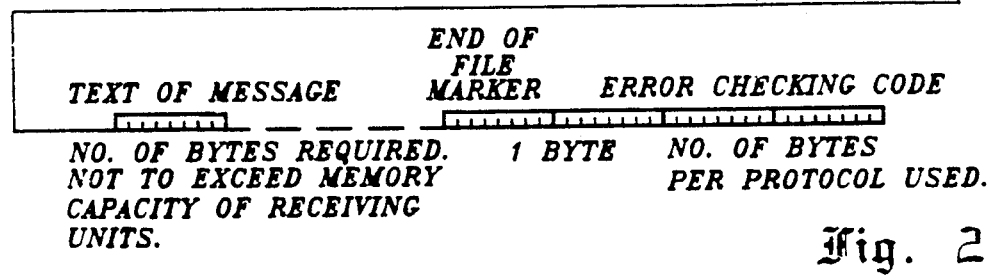

Referring to FIG. 2, the message, in a preferred embodiment, includes an alert signal of 8 bytes instructing the receiver to compare addresses; a pause; addresses designating all intended receivers, each address being 8 bytes; a beginning of file marker; the text of the message; an end of file marker; followed by error checking data. The length of the message is limited only by the amount of random access memory in the receivers, preferably a minimum of 64 kilobytes. The number of bytes in the error-checking data will vary depending upon which of several known protocols are selected for use.

The addressing format allows the device of a particular user to be addressed in several different ways. The address could consist of eight bytes. Each byte would refer to a different demographic characteristic; one for occupation, subspecialty within the occupation, type of products used in the occupation, experience, decade of age, residence, political affiliation, club memberships or whatever. Special characters in the address would allow messages to be sent, for example, to all doctors who care for children, or to those doctors who care for children and give immunizations and graduated from medical school more than ten years ago.

The addressing schema would be similar to the operation of a directory command in the MS-DOS operating system for IBM personal computers. To elaborate, one may list all files that begin with the characters "PRO" by asking for a directory with the argument "pro*.*". The receiver of the invention, with the address of "AN345678", would receive a message for all doctors with the address "to" that is "A*******". It would not receive or store a message to surgeons with a "to" address "A*4***", but it would accept a message to doctors in Nebraska with the "to" address "AN****".

With proper consideration, an eight byte address would allow a very flexible system. Upper case alphabetic characters in groups of eight could form two hundred billion different addresses. An upper case character in the "to" address would be stored in the receiver if it matches. An asterisk would mean "does not apply" or a "wild card", so the device will store if asterisks are in the non-match positions. A lower case character or a designated corresponding character could indicate a NON-character. Such a NoN-character would be ignored (interpreted as "anything else but" that classification). Accordingly, in the case above, a "to" message address "a*******" would be stored by every receiver of non-physicians.

Figure 3:
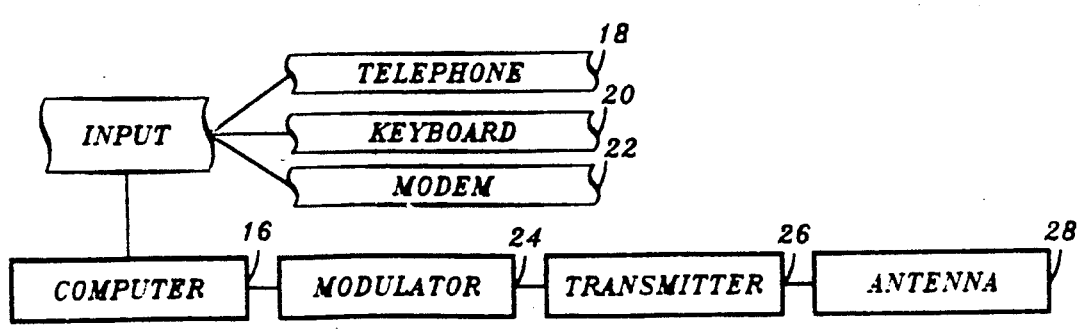
FIG. 3 is a diagrammatic illustration of the transmitting unit 12 of the invention.

The transmitting unit 12 is illustrated in FIG. 3. The input for the system would include the address or addresses of the intended recipients, together with the text of the message. As described earlier, the recipients could be defined by any of the classifications used in the addressing system, i.e., by profession, affiliation, or many other subgroups of owners.

Typically, messages would be sent once, unless a new address or set of addresses would be prefixed to a message sent previously. Any unused air time might be used with a message being sent repetitively.

The hardware would consist of a computer 16, such as a Personal Computer capable of storing, in a to-be-sent queue, the addresses and messages waiting to be sent. The addresses and messages could be input in various known ways such as by telephone 18, by being transcribed into the computer by keyboard 20, or by a modem 22.

The computer would preface the addresses to be sent with the message with an alert code, and followed by a beginning of file marker, the text of the message, the end of file marker, and finally any error-checking data.

A serial output from the computer would link it to a modulator 24, a device to turn the highs and lows (1's and 0's) from the computer into high and low audio frequencies.

This audio is fed into the transmitter 26, which would serve to broadcast the messages to the recipients. All receivers within "radio" range would hear the broadcast but, as outlined, only the receiving units of the intended recipients would store the message.

Figure 4:
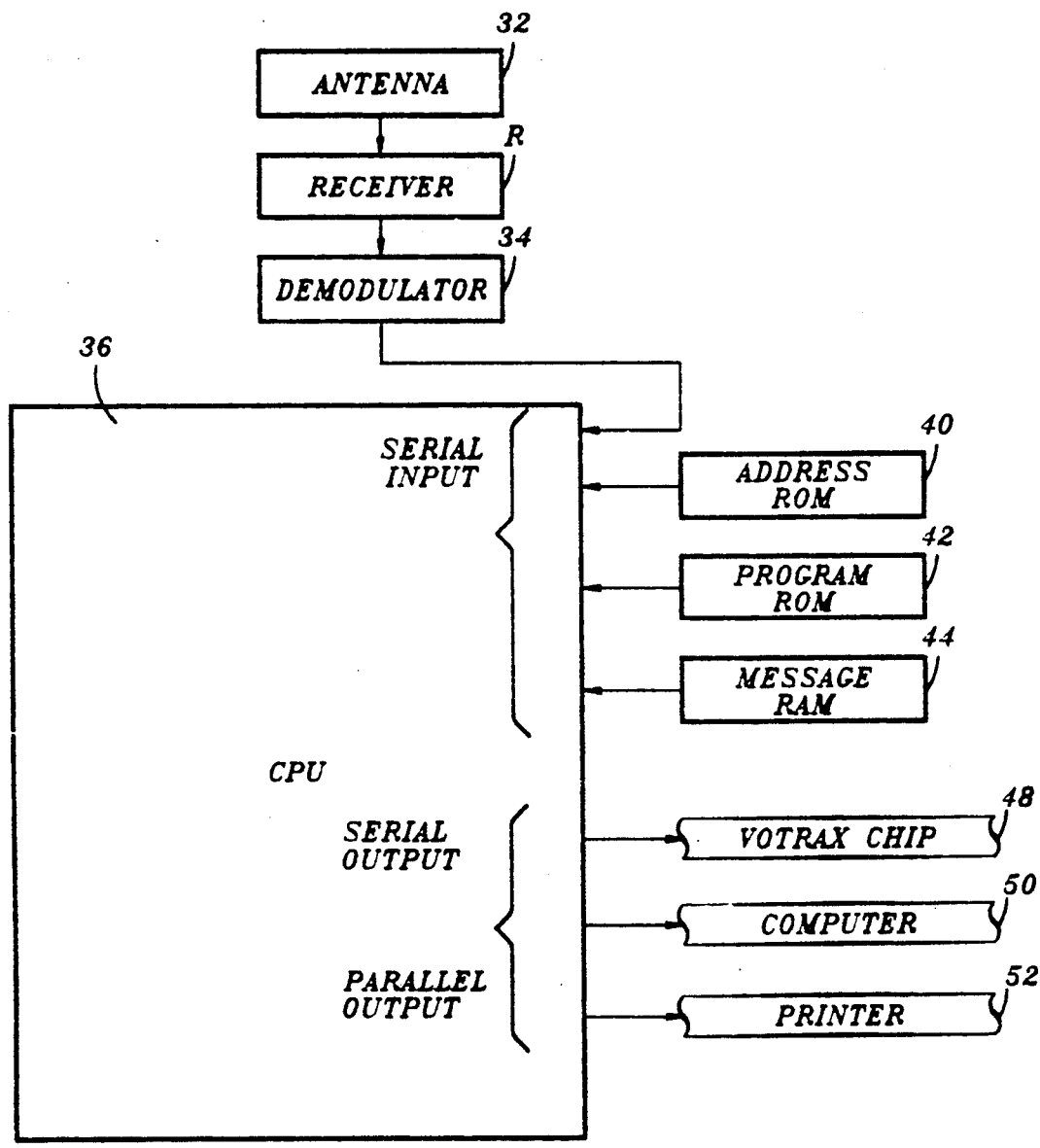
FIG. 4 is a diagrammatic illustration of the receiving unit of the invention.
Figure 3:
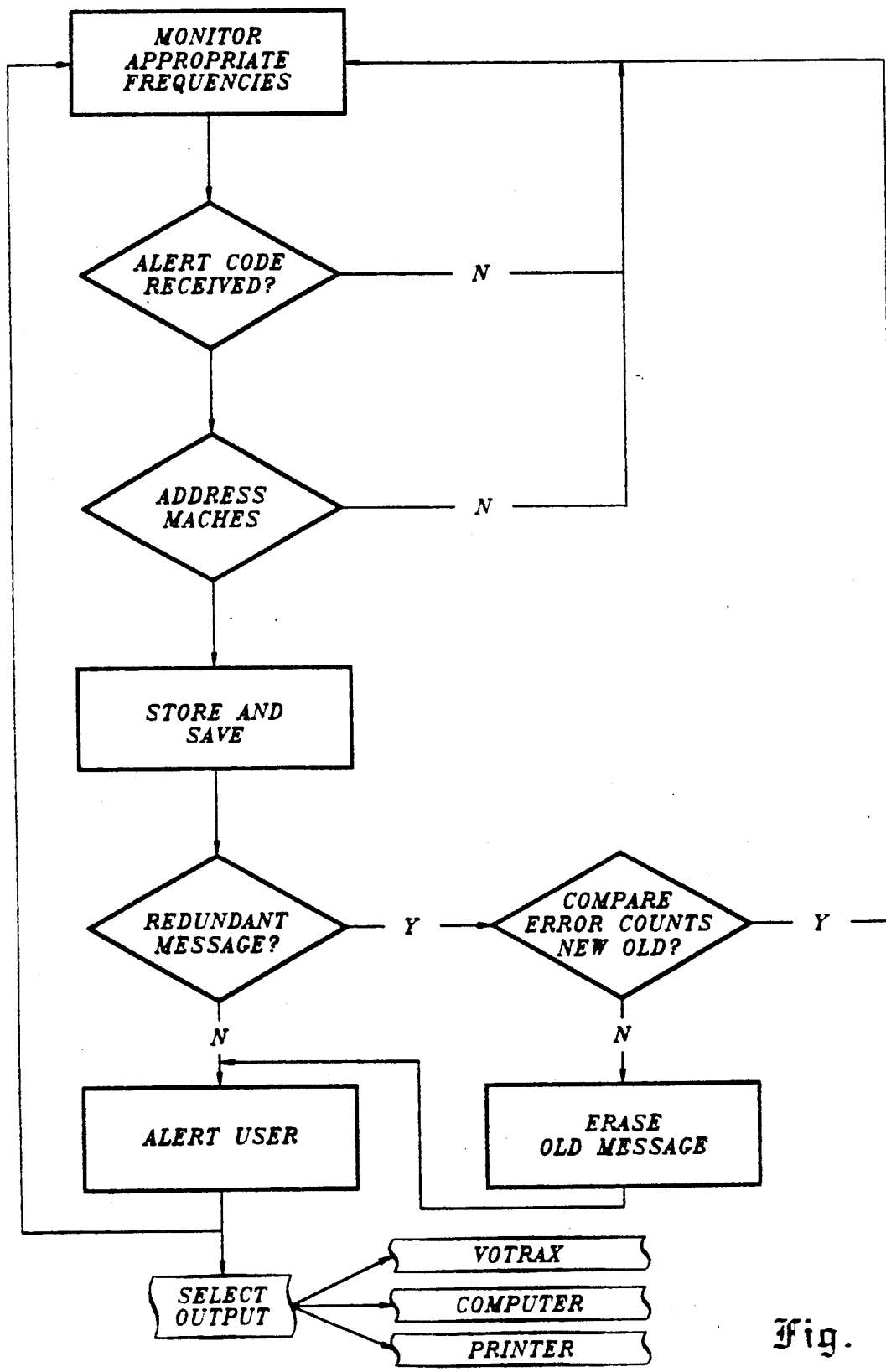

The receiving unit 30 is illustrated in FIG. 4. The receivers R1, R2, R3, etc., monitor the appropriate frequencies for alert codes which could be sent several times. Radio-wave energy travels from the antenna 32 to the receiver R, which sends audio to the demodulator 34. This converts the high and low audio tones into high and low, i.e. (RS232), voltages. These voltages form the serial input to the data processor 36 of the receiving unit.

The data processor 36 consists of a central processing unit (CPU); an input path 38 from the demodulator 34; the digital read only memory (ROM) 40 which holds the address(es) of the unit; the instructions for the CPU, such as the sample program outlined hereinbelow, which would be stored in digital memory 42 (ROM); the digital random access memory (RAM) 44 in which the messages are stored; and an output path 46.

The output path would include options to be chosen by the owner, to include any or all of the following: (a) serial output to a speech generating subunit 48; (b) serial output to another device 50, such as a computer which would allow the user to incorporate the message into a letter or memo, or allow more permanent storage of the message; (c) parallel output to a printer 52; or (d) allow the owner to erase the message.

The device could store any message received indefinitely, but messages would have to be erased eventually to allow new messages to continue to be received. On a first-in-first-out que the messages could be printed when stored messages near capacity.

After receiving the alert code, the receiver would compare the addresses received to its own address(es). Its own address is stored in digital memory 40, preferably read-only memory (ROM). This is similar in concept to the idea of amateur radio packet controllers or terminal node controllers such as those developed by the Tucson Packet Radio Group. The receiver of the invention, however, would have a totally different addressing scheme, would not monitor the broadcast medium for information not addressed to it and would not have transmitting capabilities.

If the address is such that the message should be ignored, the receiver does not store or even receive the data, and continues in a ready-to-receive state as illustrated in the flow chart of FIG. 5.

If the address of the message is appropriate for storage, as outlined below, the receiver stores the message.

After reception and storage, if the error code is correct, further transmissions of messages of the same identification code are ignored. There are many known error-checking protocols, any one of which may be incorporated into the message received in accordance with the present invention. If the error code shows that reception is not perfect, further transmissions of the same titled message with a reduced error count would overwrite the previous message as illustrated in the flow chart of FIG. 5.

When a message is stored, the user is alerted that a message has been received as indicated in FIG. 2. The alert may simply involve turning on a signal lamp or the combination of a light and audio beeper.

An example of this store-or-ignore procedure is the "cload" feature on a Radio Shack color computer. The "coco" will attempt to load each file as it is encountered on a tape, but ignore the files not requested.

When the user chooses to respond to the device by acknowledging the message, he will be told how many messages are stored. The user may choose to listen to the message through hardware generated speech, i.e., a circuit capable of generating audio from digital data 48; send the message to a terminal or computer 20 for incorporation of the message into memos or notes; or print the message on a printer 22. The user will be able to then have the device discard or continue to store the message.

SAMPLE RECEIVER PROGRAM

A BASIC program to perform the functions of the receiver of the invention follows, with appropriate explanations inserted for clarity. It is presumed that there is a radio receiver which converts the radio energy received at the antenna into the audio. It is also presumed that there is an instrument like the demodulator 34 in FIG. 4, perhaps a radioteletype or packet receiving instrument, which converts high and low audio frequencies into high and low voltages as in an RS232 format.

```
10 OPEN "COM1:1200,E,7,1" FOR INPUT AS #1 LEN = 256
20 COM(1) ON
30 ON COM(1) GOSUB 100
40 GOTO 40
```

This would be the resting state of the receiver instrument. Steps 10–30 enable the interrupt that would begin the comparing storing process when a signal is received at the first communications port. When nothing else is happening, the receiver is an endless loop at line 40. The "ON COM(1)" statement in line 30 would interrupt the endless loop when characters come in the serial port. Line 100 accepts the incoming characters into the variable "A$".

```
100 INPUT #1, A$
110 IF A$ = "!!!AL!!!" THEN 200 ELSE RETURN 20
```

This assumes that "!!!AL!!!" is the alert code for the device. If the characters received constitute the "!!!AL!!!" alert code, then the instrument proceeds to the address-comparing routine, otherwise it returns to line 20 and a ready-to-receive state.

The addressing schema may be refined, and the length of the address may be eight to sixteen bytes. In this illustration, it is presumed that the address is four bytes. Alphanumeric characters could provide 62 distinct possibilities per byte. It is presumed that the first character is for occupation, the second for age. In this illustration, the native address is assumed to be "WXYZ".

```
200 INPUT #1, B$
```

If no appropriate address is received before the "beginning of the file marker" then control passes to line 400, which waits until the "end of the file marker" before resetting the device. In this way messages not addressed to the receiver are ignored. The incoming address will be labelled as "B$."

```
210 IF B$ = "!BOF" THEN GOTO 400
```

Lines 220-250 parse the incoming address or addresses into individual fields. (In this example there are four such fields).

```
220 B1$ = LEFT$(B$,1)
230 B2$ = MID$(B$,2,1)
240 B3$ = MID$(B$,3,1)
250 B4$ = RIGHT$(B$,1)
```

Lines 260-290 of the sample program first check to determine whether the first, second, third, or fourth character is an appropriate match, or "wild card", or an appropriate "NON-character".

```
260 IF B1$ = "W" OR (ASC(B1$) > 127 AND B1$ <> "W") THEN 270 ELSE 200
270 IF B2$ = "X" OR (ASC(B2$) > 127 AND B2$ <> "X") THEN 280 ELSE 200
280 IF B3$ = "Y" OR (ASC(B3$) > 127 AND B3$ <> "Y") THEN 290 ELSE 200
290 IF B4$ = "Z" OR (ASC(B4$) > 127 AND B4$ <> "Z") THEN 300 ELSE 200
```

As stated before, the above statements test each character of the received address for either a match, a "wild card", or a "NON" ("anything else but") character, e.g., an "a" would indicate anything else but an "A". The "*" designates a "wild card" for that byte.

If a proper address is received, control passes to line 300

```
300 INPUT #1,C$
```

The above statement awaits the 'beginning of message' marker, ignoring addresses which pertain to other receiving units.

Next lines 310-370 input the received text into a string array "S$()" in order to store the received message in RAM. Each string is then tested to determine whether it is an end-of-file marker.

```
310 IF C$ = "!BOF" THEN 320 ELSE 300
320 INPUT #1,D$
330 IF D$ = "!EOF" THEN Z = 0: RETURN 20
340 Z = Z + 1: S$(Z) = D$:GOTO 320
```

The text of any incoming message is stored in the S$ array. In actual practice, this may be a two-dimensional array so that many different messages may be stored. At this point the messages would be stored and the owner alerted that a message has been received.

```
400 INPUT #1,D$: IF D$ = "!EOF" THEN RETURN 20 ELSE 400
```

Line 400 causes the program to loop while a message having an address indicating it is not to be stored is received.

Other subroutines would allow the user to output the storage message to alternative apparatus including: (a) an RS-232 port to a computer; (b) a speech generating subroutine; (c) a printer; or, (d) allow the user to erase the message. Such a program could be easily modified to run on almost any type of central processing unit.

SAMPLE ADDRESSING SCHEMA

The present addressing schema produces an exceptionally flexible communication system with an 8-bit byte and an 8-byte address having each byte set to one of 255 possible characters. For example, let us assume that these characters are taken from the following 255 characters. Let us further assume that characters 1 through 127 ("☺" through "©") are "must match" characters, that characters 129 through 255 are corresponding "anything else but" characters ("ü" through "3"), and that character 128 ("*") is a "wild card" character.

"must match" characters

|     | 0 | 1 | 2 | 3 | 4 | 5 | 6 | 7 | 8 | 9 | 10 | 11 | 12 | 13 | 14 | 15 | 16 | 17 | 18 | 19 |
|-----|---|---|---|---|---|---|---|---|---|---|----|----|----|----|----|----|----|----|----|----|
| 000 |   | ☺ | ☻ | ♥ | ♦ | ♣ | ♠ | • | ◘ | ○ | ◙  | ♂  | ♀  | ♪  | ♫  | ☼  | ►  | ◄  | ↕  | ‼  |
| 020 | ¶ | § | ▬ | ↨ | ↑ | ↓ | → | ← | ↳ | ↔ | ▲  | ▼  | þ  | !  | "  | #  | $  | %  | &  | '  |
| 040 | ( | ) | C | + | , | - | . | / | 0 | 1 | 2  | 3  | 4  | 5  | 6  | 7  | 8  | 9  | :  | ;  |
| 060 | < | = | > | ? | @ | A | B | C | D | E | F  | G  | H  | I  | J  | K  | L  | M  | N  | O  |
| 080 | P | Q | R | S | T | U | V | W | X | Y | Z  | [  | \  | ]  | ^  | _  | `  | a  | b  | c  |
| 100 | d | e | f | g | h | i | j | k | l | m | n  | o  | p  | q  | r  | s  | t  | u  | v  | w  |
| 120 | x | y | z | { | \| | } | ~ | © |   |   |    |    |    |    |    |    |    |    |    |    |

"wild card" character

|     | 0 | 1 | 2 | 3 | 4 | 5 | 6 | 7 | 8 | 9 | 10 | 11 | 12 | 13 | 14 | 15 | 16 | 17 | 18 | 19 |
|-----|---|---|---|---|---|---|---|---|---|---|----|----|----|----|----|----|----|----|----|----|
| 120 |   |   |   |   |   |   |   |   | * |   |    |    |    |    |    |    |    |    |    |    |

-continued

"anything else but" characters

|     | 0 | 1 | 2 | 3 | 4 | 5 | 6 | 7 | 8 | 9 | 10 | 11 | 12 | 13 | 14 | 15 | 16 | 17 | 18 | 19 |
|-----|---|---|---|---|---|---|---|---|---|---|----|----|----|----|----|----|----|----|----|----|
| 120 |   |   |   |   |   |   |   |   |   |   | ü  | é  | â  | ä  | à  | å  | ç  | ê  | ë  | è  |
| 140 | î | ì | Ä | Å | É | æ | Æ | ô | ö | ò | û  | ù  | ÿ  | Ö  | Ü  | ¢  | £  | ¥  | ₧  | ƒ  |
| 160 | á | í | ó | ú | ñ | Ñ | ª | º | ¿ | ⌐ | ¬  | ½  | ¼  | ¡  | «  | »  |    |    |    |    |
| 180 |   |   |   |   |   |   |   |   |   |   |    |    |    |    |    |    |    |    |    |    |
| 200 |   |   |   |   |   |   |   |   |   |   |    |    |    |    |    |    |    |    |    | ■  |
| 220 |   |   |   | α | β | Γ | π | Σ | σ | μ | τ  | Φ  | Θ  | Ω  | δ  | ∞  | φ  | ε  | ∩  |    |
| 240 | ≡ | ± | ≥ | ≤ | ⌠ | ⌡ | ÷ | ≈ | ° | • | ·  | √  | η  | ²  | ■  | ³  |    |    |    |    |

Let us assume the following eight boxes represent the preferred eight byte address scheme. Each box represents an address field, and each field may contain one byte (one character):

| 1 | 2 | 3 | 4 | 5 | 6 | 7 | 8 |

Each field may represent a classification, and each of the 127 "must match" characters (characters 1 through 127) may designate a subclass within the eight classes designated by the eight address fields.

A "must match" character (characters 1 through 127) in any one of the eight fields of the address must be matched. Thus, a receiver having an address with an "A" (character 65) in field 1 would only accept messages having an "A" (character 65) or "*" (the "wild card" character 128) in field 1 of the message's address. A receiver that has an address of "AAAAAAAA" will store a message sent with an address of "AAAAAAAA" or "AAAA**", or "A*****" or any other combination of "A" and "*".

Each character in a transmitted message address also has a corresponding "NON" ("anything else but") character to indicate that the message is to go to every address but the one indicated. The "anything else but" characters (characters 129 through 255) correspond with the "must match" characters (characters 1 through 127). Thus, character 1 corresponds to character 129, character 2 corresponds to character 130, character 3 corresponds to character 130, . . . and character 127 corresponds to character 255, i.e., "☺" corresponds to "ü", "☻" corresponds to "e", "♥" corresponds to "â", and "" corresponds to "".

As "anything else but") characters 129 through 255 indicate that the message is to be received by receivers having any character in that field other than the corresponding "must match" character. Thus, a message having an address with a "⊥" (character 193) field 1 which is the corresponding "NON-character" to "A" (character 65), would be accepted by all receivers other than those having an "A" (character 65) in field 1 of their address.

Therefore, the before mentioned receiver with an address of "AAAAAAAA" would store a message with an address of "bbbbbbbb", or "cccccccc", or "cccc", or "bbbb".

Supposing that an "A" in the first position means the receiver belongs to a doctor and an "A" in the second position means the doctor is a pediatrician, a message to all doctors who participate in MEDICARE might be addressed to "A⊥******" to exclude pediatricians.

It should now be apparent that each character of the address portion of a message sent may be one of 255 characters: 127 "must match" address characters, 127 non-address "anything else but" characters, and one "wild card" character. A receiver stores a message if the received address of the same character position is a match, a wild card, or a non-match character that is different than the address of the particular receiver. A receiver would reject a message which, by character position, has a different match character or the same "NON-character".

For the device disclosed by Giallanza, et al., U.S. Pat. No. 4,383,257, to achieve the same flexibility, it would have to evaluate each character for a match. Therefore, in order for a message sent with the Giallanza device to go to all but a certain sub-group of receivers the message would have to be sent to all other addresses. Thus, to send a message to all physicians interested in MEDICARE issues would require addresses including all receivers except "AA******" where "*" represents a wild card.

In the network of the present invention, a message may easily be sent to all receivers except one; by utilizing only one address in the preamble to that message.

For Giallanza's format to achieve this flexibility, the device would have to store enough addresses to allow the grouping of addresses to recognize $127^8$ addresses, or $6.74 \times 10^{14}$ possibilities. Thus, to achieve the flexibility of the present addressing schema, Giallanza's device would require the storage of $2^{56}$ bytes of addresses, or $2^{38}$ of 256 K RAM chips. This amount of RAM would cost in excess of a trillion dollars.

Not every address received would require the device to search through all of these stored addresses, but every address received for a message that is not stored, would require the receiver to read all of this data. This renders the Giallanza, et al., device unworkable for the network of the present invention.

Additionally, while the device disclosed by Giallanza, et al., does allow multiple addresses to be placed in the preamble of the particular message, the present invention allows much greater flexibility. For example, a message to all but receiver "AAAAAAAA" would be sent with the single address "⊥⊥⊥⊥" in the present network. However, the network disclosed by Giallanza, et al., using multiple addresses to reach a large sub-group to the exclusion of one sub-group would require a lengthy preamble transmission. To send the "⊥⊥⊥⊥" message in the worst-case scenario would require $127^8 - 1$ addresses. To send these addresses at 1200 baud would require 122 million years.

Likewise, the addressing schema disclosed by Morriën, et al., PHILIPS TELECOMMUNICATION REVIEW, Vol. 36, No. 1, April 1978, has a 17-bit address. Such an address would allow a maximum of 132000 pagers and 4-bit messages. Even if the address schema disclosed by Morriën were expanded to 64 bits, and multiple addresses were to be included in the preamble to a message, as per Giallanza, et al., U.S. Pat. No. 4,383,257, it would be necessary to transit $127^5$ addresses rather than a single address of the type disclosed herein. Additionally, Morriën, et al., does not include exclusion or "anything else but" characters, and therefore, would not allow messages to be received by only interested receivers.

In the wild card schema of Morriën, only the end bits (at the right end of the addresses on page 44) are possibly used as wild cards. Thus, it would be impossible to send a message to subgroups of users defined by several different characters of applicant's receiver address. For example, to send a message to physicians in Nebraska who graduated after 1970, say an address of "A*-*A***A") one would have to include many addresses in the transmitted message. The present invention requires only one address to include all selected receivers. Assuming multiple addresses were allowed in the Morriën preamble, it would require the transmission of $127^5$ addresses, and several years of transmission time.

Whereas, the data transmission network of the invention has been shown and described in connection with preferred embodiments thereof, it is apparent that many modifications, additions and substitutions may be made which are within the intended broad scope of the appended claims. For example, the receiver could be a scanning receiver to allow the user to monitor different frequencies so that the receiver could be used in different regions around the country. For security purposes, different codes could be used for different networks, possibly by mixing up the alphabet and transmissions could be made at different speeds. Additionally, a receiver might have a plurality of addresses in order to receive messages relating to more than one area of interest so that a single receiver could be utilized by more than one individual. The invention leaves much room for further definition of the addressing scheme or expansion of the receiver, possibly to incorporate a printer or to enable the user to call his receiver on the telephone to check messages.

Thus, there has been shown and described a data transmission network that accomplishes at least all of the stated objects.

I claim:

1. A data transmission network for transmission of messages to selected ones of a plurality of users according to one or more multiple user classifications, each classification indicative of a characteristic of respective ones of said plurality of users, said network comprising:
   a transmitter operative to transmit messages via a radio wave type communications medium,
   a plurality of distinct radio wave type receivers, each receiver including digital memory,
   means for readably storing a multiple byte digital receiver address unique to each receiver, each individual byte of said receiver address designating a classification applicable to that receiver and being selected from the group consisting of a number of distinct must match characters and thereby operative to indicate a selection from said classification,
   said transmitter being operative to transmit a message including multiple byte message address and test portions, each individual byte of said message address portion being selected from the group consisting of
      a plurality of distinct must match characters, each designating a selection from the classification designated by that byte,
      a plurality of NON-characters each corresponding to a respective character and indicating anything else but said corresponding must match character, and
      a wild card character, meaning need not match, so that each individual byte of said message address portion is operative to indicate both a selection from a classification as well as whether that selection must match, must be anything else but, or need not match a receiver address,
   said receiver being operative to receive messages transmitted by said transmitter, to compare the receiver address assigned to that receiver with the message address portion of a transmitted message, and to store in said digital memory all messages, transmitted by said transmitter, except for those wherein a must match character byte of the message address portion differs from the corresponding byte of the receiver address and except for those wherein a NON-character byte of the message address corresponds to the compared must match byte of the receiver address,
   said receiver including signal means operative to indicate that a message has been received, and
   output means operative to communicate a received message in said digital memory to an operator.

2. The data transmission network of claim 1 wherein said communications medium comprises a sub-audible carrier on the FM broadcast band.

3. That data transmission network of claim 1 wherein said communications medium comprises a sub-audible carrier on one of the VHF and UHF business bands.

4. The data transmission network of claim 1 wherein each message additionally includes an alert code, a title code, a beginning of file marker and an end of file marker.

5. The data transmission network of claim 4 wherein one of said file markers include an error-checking code.

6. The data transmission network of claim 1 wherein each byte of said multiple byte address refers to a different classification.

7. The data transmission network of claim 1 wherein said output means comprises means for audibly producing hardware generated speech.

8. The data transmission network of claim 1 wherein said output means comprises means for communicating said message to a computer.

9. The data transmission network of claim 1 wherein said output means includes a printer.

10. The data transmission network of claim 1 further comprising means for erasing message from said digital memory.

11. The data transmission network of claim 1 wherein said digital memory comprises a random access memory.

12. A data transmission process for transmission of messages to selected ones of a plurality of users according to one or more multiple user classifications, each classification indicative of a characteristic of respective ones of said plurality of users, said network comprising, providing a transmitter operative to transmit messages via a radio wave type communications medium, providing a plurality of distinct radio wave type receivers, each receiver including digital memory, assigning a unique multiple byte digital receiver address to each receiver, each individual byte of said receiver address designating a classification applicable to that receiver and being selected from the group consisting of a number of distinct must match characters and thereby operative to indicate a selection from said classification, transmitting a message including multiple byte message address and test portions from said transmitter, each individual byte of said message address portion being selected from the group consisting of a plurality of distinct must match characters, each designating a selection from the classification designated by that byte, a plurality of NON-characters each corresponding to a respective must match character and indicating anything else but said corresponding must match character, and a wild card character, means need not match, so that each individual byte of said message address portion is operative to indicate both a selection from a classification as well as whether that selection must match, must be anything else but, or need not match a receiver address, receiving messages transmitted by said transmitter to said receiver, comparing the receiver address assigned to that receiver with the message address portion of a transmitted message, and storing in said digital memory all messages, transmitted by said transmitter, except for those wherein a must match character byte of the message address portion differs from the corresponding byte of the receiver address and except for those wherein a NON-character byte of the message address corresponds to the compared must match byte of the receiver address, providing signal means operative to indicate that a message has been received, and providing an output means operative to communicate a received message in said digital memory to an operator.

13. The data transmission process of claim 12 further comprising erasing the stored message from the random access memory.

14. The data transmission process of claim 12 wherein said multiple byte address is indicative of a plurality of characters selected from the group including numeric, alphabetic and graphic characters.

* * * * *